(12) United States Patent
Sasaki et al.

(10) Patent No.: US 7,177,928 B2
(45) Date of Patent: *Feb. 13, 2007

(54) STATUS SETTING SYSTEM AND METHOD

(75) Inventors: Kazuo Sasaki, Kawasaki (JP); Ryuichi Matsukura, Kawasaki (JP); Ai Manabe, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 459 days.

This patent is subject to a terminal disclaimer.

(21) Appl. No.: 09/725,215

(22) Filed: Nov. 29, 2000

(65) Prior Publication Data

US 2002/0161837 A1   Oct. 31, 2002

(30) Foreign Application Priority Data

Mar. 3, 2000 (JP) .............................. 2000-058214

(51) Int. Cl.
*G06F 15/173* (2006.01)
(52) U.S. Cl. ...................... 709/224; 717/174
(58) Field of Classification Search ................ 709/203, 709/204, 206, 217, 223, 219, 227, 232, 205, 709/208, 209; 345/753, 757, 765, 330; 707/10, 707/3, 101; 379/202; 700/286; 455/412; 463/42; 340/825; 370/252; 714/39; 713/200; 434/350; 715/733; 717/174
See application file for complete search history.

(56) References Cited

U.S. PATENT DOCUMENTS 5,253,342 A * 10/1993 Blount et al. ................ 709/232
5,495,522 A * 2/1996 Allen et al. ............. 379/202.01
5,583,993 A * 12/1996 Foster et al. ................. 709/205
5,802,296 A * 9/1998 Morse et al. ................ 709/208
5,838,909 A * 11/1998 Roy et al. .................... 709/209
5,909,543 A * 6/1999 Tanaka et al. ............... 709/204
5,995,096 A * 11/1999 Kitahara et al. .............. 345/753
6,023,698 A * 2/2000 Lavey et al. ................... 707/10
6,029,198 A * 2/2000 Iizuka ......................... 709/223
6,141,528 A * 10/2000 Remschel .................... 434/350
6,205,473 B1 * 3/2001 Thomasson et al. ......... 709/217

(Continued)

FOREIGN PATENT DOCUMENTS

JP       09-034868        2/1997

OTHER PUBLICATIONS

Chat Circles; www.media.mit.edu/~fviegas/chat_circles.pdf.*

(Continued)

*Primary Examiner*—Thong Vu
(74) *Attorney, Agent, or Firm*—Staas & Halsey LLP

(57) ABSTRACT

A status setting method that includes, setting and notifying a status that is suitable to a channel, preparing a status table for storing a settable status for each channel, and obtaining the status table of the channel. The user status in each channel is selected from among statuses registered in the status table of the channel and then set. Users can set a suitable status for each channel because the status table is set according to properties of each channel and user statuses can be separately set for each channel. It is preferable that a particular user such as an administrator set a status table. A settable status in a channel can be changed according to a user attribute in the channel.

10 Claims, 15 Drawing Sheets

U.S. PATENT DOCUMENTS

| | | | |
|---|---|---|---|
| 6,236,986 B1* | 5/2001 | Gestrelius et al. | 707/3 |
| 6,347,374 B1* | 2/2002 | Drake et al. | 713/200 |
| 6,363,421 B2* | 3/2002 | Barker et al. | 709/223 |
| 6,377,993 B1* | 4/2002 | Brandt et al. | 709/227 |
| 6,449,765 B1* | 9/2002 | Ballard | 717/174 |
| 6,484,196 B1* | 11/2002 | Maurille | 709/206 |
| 6,519,509 B1* | 2/2003 | Nierlich et al. | 700/286 |
| 6,564,244 B1* | 5/2003 | Ito et al. | 709/204 |
| 6,564,261 B1* | 5/2003 | Gudjonsson et al. | 709/227 |
| 6,577,328 B2* | 6/2003 | Matsuda et al. | 345/757 |
| 6,584,494 B1* | 6/2003 | Manabe et al. | 709/204 |
| 6,587,870 B2* | 7/2003 | Takagi et al. | 709/204 |
| 6,592,459 B2* | 7/2003 | Parra et al. | 463/17 |
| 6,625,652 B1* | 9/2003 | Miller et al. | 709/227 |
| 6,629,134 B2* | 9/2003 | Hayward et al. | 709/217 |
| 6,631,407 B1* | 10/2003 | Mukaiyama et al. | 709/223 |
| 6,643,289 B1* | 11/2003 | Natanson et al. | 370/395.2 |
| 6,654,457 B1* | 11/2003 | Beddus et al. | 379/265.02 |
| 6,671,508 B1* | 12/2003 | Mitsuoka et al. | 455/412.1 |
| 6,678,719 B1* | 1/2004 | Stimmel | 709/204 |
| 6,728,720 B1* | 4/2004 | Lenzie | 707/101 |
| 6,735,615 B1* | 5/2004 | Iwayama et al. | 709/204 |
| 6,750,881 B1* | 6/2004 | Appelman | 715/733 |
| 6,751,656 B2* | 6/2004 | Kohda et al. | 709/219 |
| 6,755,743 B1* | 6/2004 | Yamashita et al. | 463/42 |
| 6,807,562 B1* | 10/2004 | Pennock et al. | 709/204 |
| 6,865,385 B1* | 3/2005 | Kohda et al. | 455/414.1 |
| 6,915,336 B1* | 7/2005 | Hankejh et al. | 709/219 |
| 2002/0002584 A1* | 1/2002 | Takagi et al. | 709/204 |

OTHER PUBLICATIONS

Butterfly: A Conversation-Finding Agent for Internet Relay Chat; citeseer.nj.nec.com/vandyke99butterfly.html.*

Global Meeting Plus; citeseer.nj.nec.com/292788.html.*

Stateful Multicast services fro SUpporting Collaborative Applications; citeseer.nj.nec.com/118465.html—19k.*

CMLOG: A Common Message Logging System—Chen, Akers, Bickley, Wu, Watson, .. ; www.aps.anl.gov/icalepcs97/paper97/p075.pdf.*

A Quality Control Mechanism for Networked Virtual Reality..—Kazutoshi Fujikawa (1998) ; www.media.osaka-cu.ac.jp/~fujikawa/doc/icmcs/final98.ps.gz.*

Analysis Of Web Traffic And Users' Behaviour Modeling..—Koucheryavy, Krendzel ; wwwtgs.cs.utwente.nl/eunice/summerschool/papers/paper1-2.pdf.*

Database Requirement Analysis for a third generation mobile..—Ronström (1999) www.ida.liu.se/labs/caelab/Appl.pdf.*

Database Support for Computer Supported Cooperative Work—Yahiko Kambayashi (1996) www.darmstadt.gmd.de/~konomi/publication/dbcscw@dai96.ps.gz.*

Wrens: A Framework for Rapidly Evolvable Network Services—Anurag Acharya Maximilian (1999) www.cs.ucsb.edu/TRs/techreports/TRCS99-31.ps.*

CORAL: A Multi-server Distant Cooperative Learning System—Lin, Lai, Chang speed.cis.nctu.edu.tw/Postscript/Conference/coralp.ps.*

Multimodal User Interfaces in the Open Agent Architecture—Moran, Cheyer, Julia, Martin (1997) ftp.speech.sri.com/pub/people/julia/papers/iui97.ps.gz.*

DistView: Support for Building Efficient Collaborative..—Prakash (1994) ftp.eecs.umich.edu/people/aprakash/collaboration/papers/cscw94.ps.Z.*

Concurrency Control and View Notification..—Strom, Banavar.. (1997) www.eecs.umich.edu/~aprakash/598notes/icdcs97.ps.*

WebFlow—A Visual Programming Paradigm for..—Bhatia.. (1997) ftp.npac.syr.edu/pub/docs/sccs/papers/ps/0750/sccs-0787.ps.Z.*

Japanese Patent Office Action, dated Sep. 5, 2006.

Hiroaki Harada, "A Virtual Environment for Electric Community", The Institute of Electronics, Information and Communication Engineers, Technical Report of IEICE, MVE98-73-76, (Oct.-1998), vol. 98, No. 339, pp. 21-28.

Susumu Konno et al., "Human-Agent Symbiotic Space for Office Work Support", The Institute of Electronics, Information and Communication Engineers, Technical Report of IEICE, AI96-30-42, (Jan.-1997), vol. 96, No. 453, pp. 69-75.

Japanese Patent Office Action, mailed Dec. 5, 2006, and issued in corresponding Japanese Patent Application No. 2000-058214.

* cited by examiner

Common table

| Status | Identifier |
|---|---|
| Present | on |
| Away | out |
| Busy | and |
| Absent | off |

Status table of #CH1

| Status | Identifier |
|---|---|
| Present | on |
| Outside work | out |
| Dealing with a customer | cust |
| Absent | off |

Status table of #CH2

| Status | Identifier | User attribute |
|---|---|---|
| Yes | yes | Student |
| No | no | Student |
| Understand | and | Student |
| Hard to understand | diff | Student |
| Not understandable | over | Student |
| Questionable | gue | Student |
| Explaining | expl | Teacher |
| That's the point | imp | Teacher |
| Accepting questions | ga | Teacher |
| Break | brk | Teacher |

*Fig.6*

Office 1

| Name | Status |
|---|---|
| Sasaki Taro | Present |
| Matsukura Jiro | Absent |
| Manabe Hanako | Present |
| Okano Shinich | Away |
| Usuki Shigeru | Busy |

Sasaki Taro>Today's meeting is held at 1:00.
Manabe Hanako>Roger.

Self status setting menu

Present
Away
Busy
Absent

Business transaction second section

| Name | Status |
|---|---|
| Sasaki Taro | Present |
| Fukuda Takeshi | Outside work |
| Suzuki Jiro | Dealing with a customer |
| Saito Goro | Absent |

Fukuda Takeshi>I'm back at 3:00.
Sasaki Taro>Understand

Self status setting menu

Present
Outside work
Dealing with a customer
Absent

*Fig.7*

Teacher's side

Physics online class

| Name | Status |
|------|--------|
| Uehara Taro (teacher) | Explaining |
| Nakajo Jiro (student) | Questionable |
| Hirai Hanako (student) | Understandable |
| Okano Kyoko (student) | Hard to understand |
| Isono Saburo (student) | Not understandable |

Uehara Taro (teacher)>Mr. Nakajo, what is your question?
Nakajo Jiro (student)>Well, I don't fully understand the explanation of problem 2.

Self status setting menu
- Explaining
- That's the point
- Accepting questions
- Break
- Yes
- No
- Understandable
- Hard to understand
- Not understandable
- Questionable

Student's side

Physics online class

| Name | Status |
|------|--------|
| Nakajo Jiro (student) | Questionable |
| Uehara Taro (teacher) | Explaining |
| Hirai Hanako (student) | Understandable |
| Okano Kyoko (student) | Hard to understand |
| Isono Saburo (student) | Not understandable |

Uehara Taro (teacher)>Mr. Nakajo, what is your question?
Nakajo Jiro (student)>Well, I don't fully understand the explanation of problem 2.

Self status setting menu
- Explaining
- That's the point
- Accepting questions
- Break
- Yes
- No
- Understandable
- Hard to understand
- Not understandable
- Questionable

*Fig. 9*

Register Window

Online class status table setting screen

| Status name | User attribute | Icon information |
|---|---|---|
| Yes | Student | _yes.ico |
| No | Student | _no.ico |
| Questionable understandable | Student | _qst.ico |
| Not understandable | Student | _uds.ico |
| Explaining | Teacher | _dud.ico |
| Accepting questions | Teacher | _exp.ico |
|  |  | _rep.ico |

[Add] [Register] [Cancel]

| Status name: | Hard to understand | User attribute: | Student | Icon information: | _udn.ico |
|---|---|---|---|---|---|

[OK] [Cancel]

*Fig. 10*

Icon list
| Icon file name | Icon |
|---|---|
| Man1. ico |  |
| Man1_ off. ico |  |
| Man1_ on. ico |  |
| Man1_ aw. ico |  |
| Man1_ busy. ico |  |
| ⋮ | |
| Man2. ico ⋮ | |
*Fig.11*

| Virtual space name | User name | Status | Fundamental icon | Status icon |
|---|---|---|---|---|
| #CH1 | John | Absence | Man1 | Man1_off.ico |
| | Marry | Presence | WMan1 | Wman1_on.ico |
| | Mike | Busy | Man2 | Man2_dnd.ico |
| #CH2 | John | Performing an experiment | Man1 | Man1_exp.ico |
| | Steve | Paperwork | Man1 | Man1_dwk.ico |
| | Green | In conference | Man3 | Man3_conf.ico |
| #CH3 | Mike | Waiting | Man2 | Man2_wt.ico |
| | Kathy | Supporting | Wman2 | Wman2_rcp.ico |

*Fig.12*

(a) Fundamental icon table
| User name | Fundamental icon file name | Icon |
|---|---|---|
| Fujitsu Taro | Man1.ico |  |
| Fujitsu Jiro | Man2.ico |  |
(b) Auxiliary icon table
| Status | Icon file name | Icon |
|---|---|---|
| Presence | N/A | N/A |
| Busy | dnd.cio |  |
| Away | away.ico |  |
| Absent | off.ico |  |
*Fig.13*

STATUS SETTING SYSTEM AND METHOD

BACKGROUND OF THE INVENTION

1. Technical Field

The present invention relates to technologies for sharing a virtually constructed space on a network and for notifying other users of user status such as attendance or absence. The present invention more particularly relates to technologies that enable each user to share the status on every individual user on the same virtual space.

2. Description of Related Art

In present invention, a chat system is configured to include multiple chat devices. The chat device is connected to a network. Each user can receive and send text messages through a shared virtual space set up on a network. The chat device can display a text message to be sent or received. IRC (Internet Relay Chat), forums on Nifty, and WebChat are examples of chat systems.

IRC is one type of chat system constructed in compliance with the IRC protocol (RFC1459). An IRC system is constructed by connecting IRC servers to its clients via the Internet. The IRC client shares a virtual space, called a channel, and sends and receives text messages in real time. The IRC server broadcasts messages to the IRC clients that share the same channel. In an IRC system, each IRC client is uniquely designated by an identifier called a nickname.

WebChat is a chat system constructed with WWW servers and WWW browsers on the Internet. In this case, users converse by viewing text messages or sending their own messages after accessing a Web page. For WebChat, a real-time chat system is provided.

The chat support device in the present invention operates on a user terminal together with the chat device. The chat support device sends and receives the status of users sharing a virtual space, and displays them with conversation contents.

A communication system is diffused in a virtual space on a network on which communications are performed. IRC, forums on Nifty, and WebChat are examples of chat systems on which a user can send and receive text messages in real time in virtual space. In IRC, chat clients who operate user terminals enter a particular virtual space denoted by its channel, and the chat clients can converse with other users on the same channel by characters in real time.

In a real-time chat system as typified by a chat system, messages can be sent in real time and at any time. Thus, activities of other users can be easily interrupted. There is a growing need to communicate in ways that are considerate to the status of other users. For example, the status of one user may indicate that he/she is willing to receive messages. Alternatively, the status may indicate that the user is busy and does not wish to be disturbed.

Responding to the aforementioned need, Japanese Laid-Open Pat. App. 1999-185802 provides a chat support device that allows users to share each user's status, and allows users to converse even if other users in a virtual space enter or leave the space. With this chat support device, the status of users participating in the virtual space is displayed on a screen. Users who newly connect to the virtual space make their status known to other previously connected users. These notifications are received by other chat support device in the virtual space and displayed on terminals of other users.

Conversely, if any of the users withdraws from the virtual space, the chat support device detects the withdrawal and deletes the status display of the relevant user. By using the chat support device, users can share the status of other users, even users enter into or leave from virtual space change. A user's status is detected by a detection part of a user terminal. Alternatively, a user's status can be set by the user.

Normally, participating users and/or topics in a virtual space can completely change depending on the virtual space. Accordingly, the status to be notified or the status of another user to be known often varies depending on properties of the virtual space. For example, salespersons in a company may notify their status using identifiers such as "Outside work" or "Dealing with a customer" in their virtual space. On the other hand, researchers may notify their status using identifiers such as "Performing an experiment" or "Paperwork" in their virtual space. It is convenient that different status identifiers in each virtual space can be set according to each virtual space.

However, in Japanese Laid-Open Pat. App. 1999-185802, a status identifier of one user is common to all virtual spaces and limited to one status. On this account, there is a problem that each virtual space cannot be notified different status identifiers according properties of virtual spaces. Furthermore, a status identifier that a user can specify is limited to those predetermined by a system. Therefore, status identifiers cannot be set according to properties of the virtual space.

Status identifiers may need to be changed according to the role of a user in a virtual space. For example, a status set by a student should be different from a status set by a teacher in a virtual space where a teacher conducts an online class with students. The students may wish to set status identifiers such as "Yes," "No," "Hard to understand," or "Understand." The teacher may wish to set a status identifier such as "Accepting questions," or "Explaining." If all of these status identifiers can be selected regardless of the role of users, problems may occur if students can select a teacher's status identifier or vice versa.

SUMMARY OF THE INVENTION

The object of the present invention is to provide technologies for status setting suitable for properties of each virtual space to promote smooth communication.

To solve the problem, a first aspect of the present invention provides a status setting method in which a user terminal can send, receive, and display a user status and a character message by sharing one or more virtual spaces set up on a network comprising;

preparing a status table in which configurable user statuses are registered for each virtual space;

obtaining the status table of a virtual space in which a user terminal participates every time the user terminal participates in the virtual space;

setting a user status on each virtual space for the virtual space based on an obtained status table; and sending to, receiving from, and displaying for each virtual space the user status set for each virtual space.

A user status suitable for properties of a virtual space is registered on a status table of the virtual space. For example, a status identifier such as "Present," "Absent," "Dealing with a customer," or "Outside work" is registered on the status table of a virtual space in which salespersons participate. Meanwhile, a status identifier such as "Performing an experiment," "Paperwork," or "In conference", is registered on the status table of a virtual space in which researchers participate. A user obtains a status table of a participating virtual space by some method. Any of the user statuses registered on the status table is selected and set as the status on the virtual space. Either manual selection by a user or automatic selection by some method can be accepted. The set user status is notified to the same virtual space.

A second aspect of the present invention provides a status setting method as set forth in the first aspect, wherein the user status and a user attribute defining configurable user statuses are correlatively registered in the status table.

For example, the status identifiers from which a student may choose should be different from the status identifiers of a teacher in a virtual space where an online class is conducted. In this case, correspondence between a user attribute such as "Student" or "Teacher" and a status that can be set in the attribute is set and registered in a status table.

A third aspect of the present invention provides a status setting method as set forth in the first aspect, wherein a common table in which prescribed user statuses are registered is previously prepared. The common table is obtained if no status table is prepared for a virtual space in which user terminals participate, and a user status on the virtual space is set for the virtual space based on an obtained common table. A common table is prepared just in case that no status tables are prepared for a virtual space in which user terminals participate.

A fourth aspect of the present invention provides a status setting method as set forth in the first aspect, wherein setting of a user status by a user is accepted.

For example, adding a user status to a status table or changing a user status on a status table is accepted from an administrator of the virtual space. A user status suitable for properties of the virtual space can be set or notified.

A fifth aspect of the present invention provides a status setting method as set forth in the first aspect, wherein if said user terminal can display a user status with a symbol, and the user status and the symbol are correlatively registered in a status table. A status of another user sharing a virtual space is displayed with a symbol relating to the user status. For example, assume that a user status identifier "Absent" is related to an "Absence", icon. In this case, the "Absence", of the user in the virtual space is notified to other users by displaying the "Absence" icon.

A sixth aspect of the present invention provides a status setting method as set forth in the first aspect, wherein a list of user statuses registered in an obtained status table is displayed independently on each virtual space in which user terminals participate. Selecting any of the user statuses on the list for each virtual space is accepted in order to set a user status for each virtual space.

For example, a Self status Setting Menubar is provided in the window where conversations on a virtual space are displayed. When a user presses the Self Status Setting Menubar, a list of settable statuses of that virtual space is displayed and the user can select any of the statuses.

A seventh aspect of the present invention provides a computer-readable recording medium having a status-setting module for executing the method set forth in any of the first to sixth aspects of the invention. Herein a computer-readable medium is preferably a floppy disk, hard disk, semiconductor memory, CD-ROM, DVD, MO, etc.

An eighth aspect of the present invention provides a transmission medium transmitting a status setting module for executing a method set forth in any of the first to sixth aspects of the invention. Herein a transmission medium is preferably a communication medium on a computer network system (LAN, Internet, or radio communication network) for transmitting and providing module information as a carrier wave, a fiber optic, or a radio circuit.

A ninth aspect of the present invention provides a status setting system comprising user terminals, a storing means, an obtaining means, a setting means, and a displaying means. The user terminals can send and receive user statuses and character messages by sharing one or more virtual space set on a network.

The storing means stores a status table on which configurable user statuses are registered is stored for each virtual space. The obtaining means obtains the status table of a virtual space in which a user terminal participates every time a user terminal participates in the virtual space. The setting means sets a user status on each virtual space for each virtual space based on an obtained status table. The displaying means receives from, sends to, and displays for each virtual space the user status set for each virtual space.

The ninth aspect of the present invention has the same effect as the first aspect of the invention.

BRIEF DESCRIPTION OF THE DRAWINGS

FIG. 6 is a conceptual explanatory diagram of status tables stored in a dedicated terminal in accordance with the first embodiment of the present invention.

FIG. 7 is a display example of Setting Window when plural channels are independently displayed in accordance with the first embodiment of the present invention.

FIG. 9 is a display example of Register Window in accordance with the first embodiment of the present invention.

FIG. 10 is a display example of Register window setting a status table in accordance with the first embodiment of the present invention.

FIG. 11 is a conceptual explanatory diagram of an icon list stored in a dedicated terminal in accordance with the first embodiment of the present invention.

FIG. 12 is a conceptual explanatory diagram of a virtual space table created by a status setting device in accordance with the first embodiment of the present invention.

FIG. 13 is a conceptual explanatory diagram of another icon list stored in a dedicated terminal in accordance with the first embodiment of the present invention.

(a) Fundamental icon list (b) Auxiliary icon list

Figure 14:
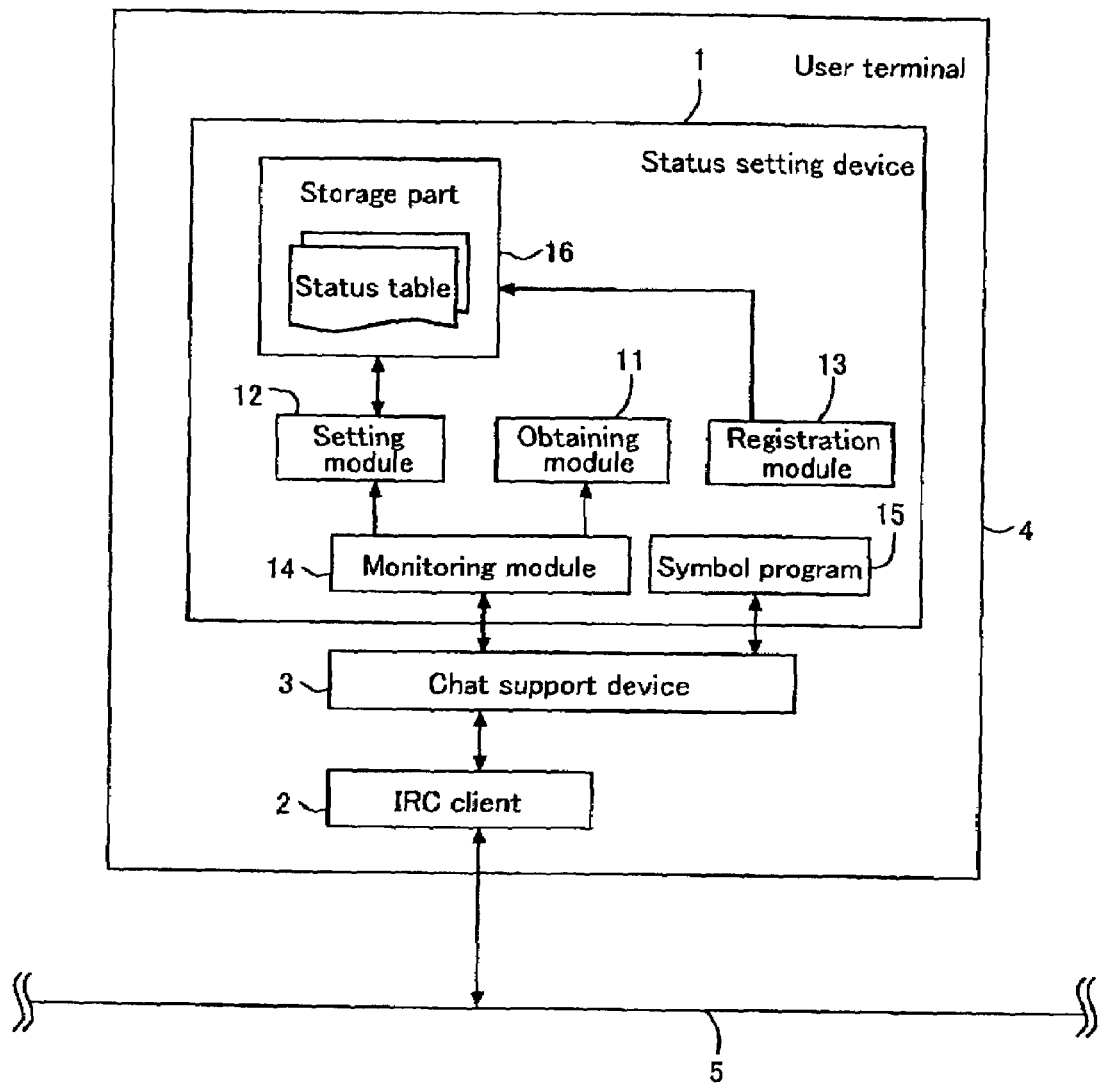

FIG. 14 is a function configuration view of the status setting system according to a second embodiment of the present invention.

Figure 15:
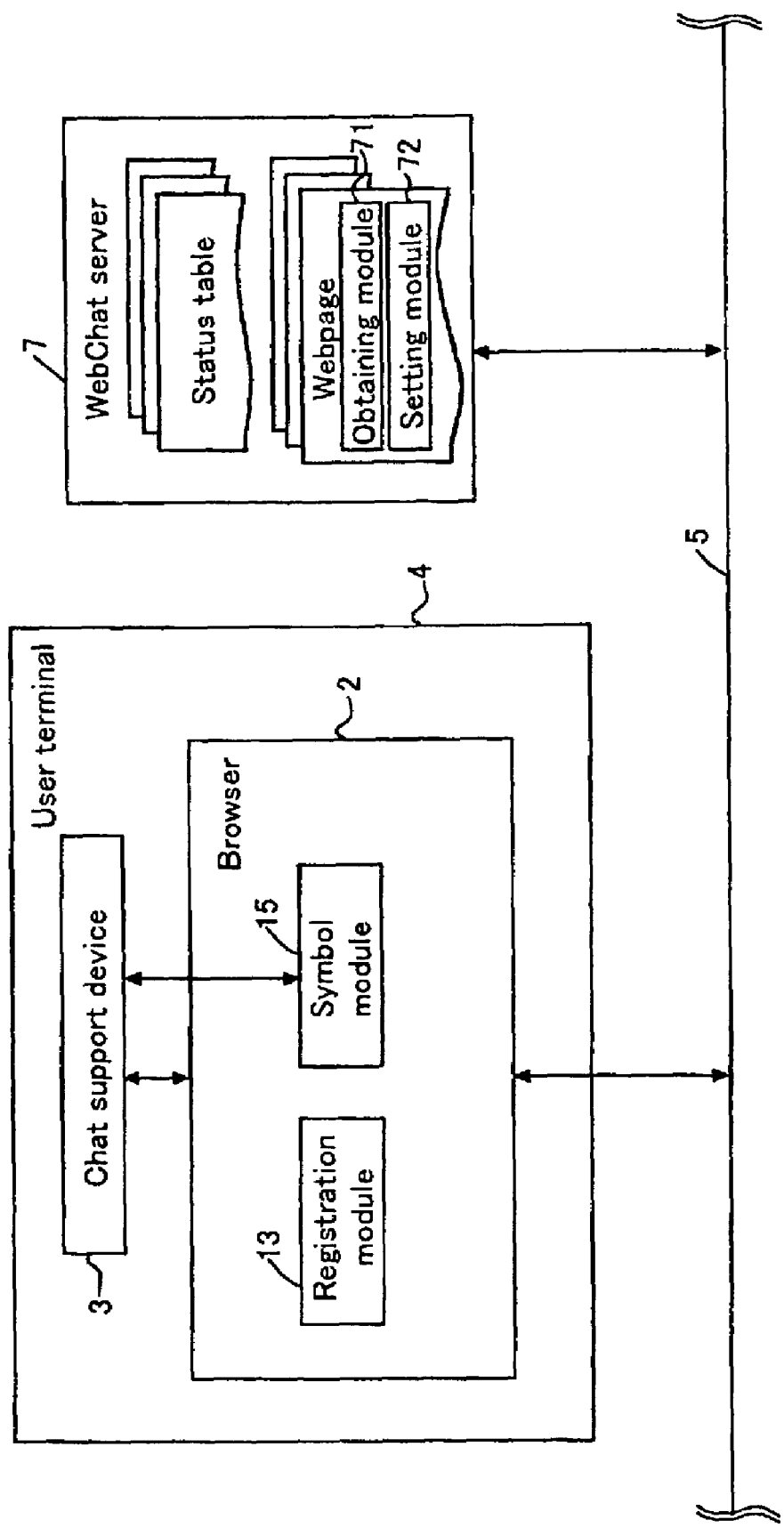

FIG. 15 is a function configuration view of the status setting system according to a third embodiment of the present invention.

DETAILED DESCRIPTION OF THE PREFERRED EMBODIMENTS

The following explains in detail the status setting system according to the present invention, referencing the drawings.

Figure 1:
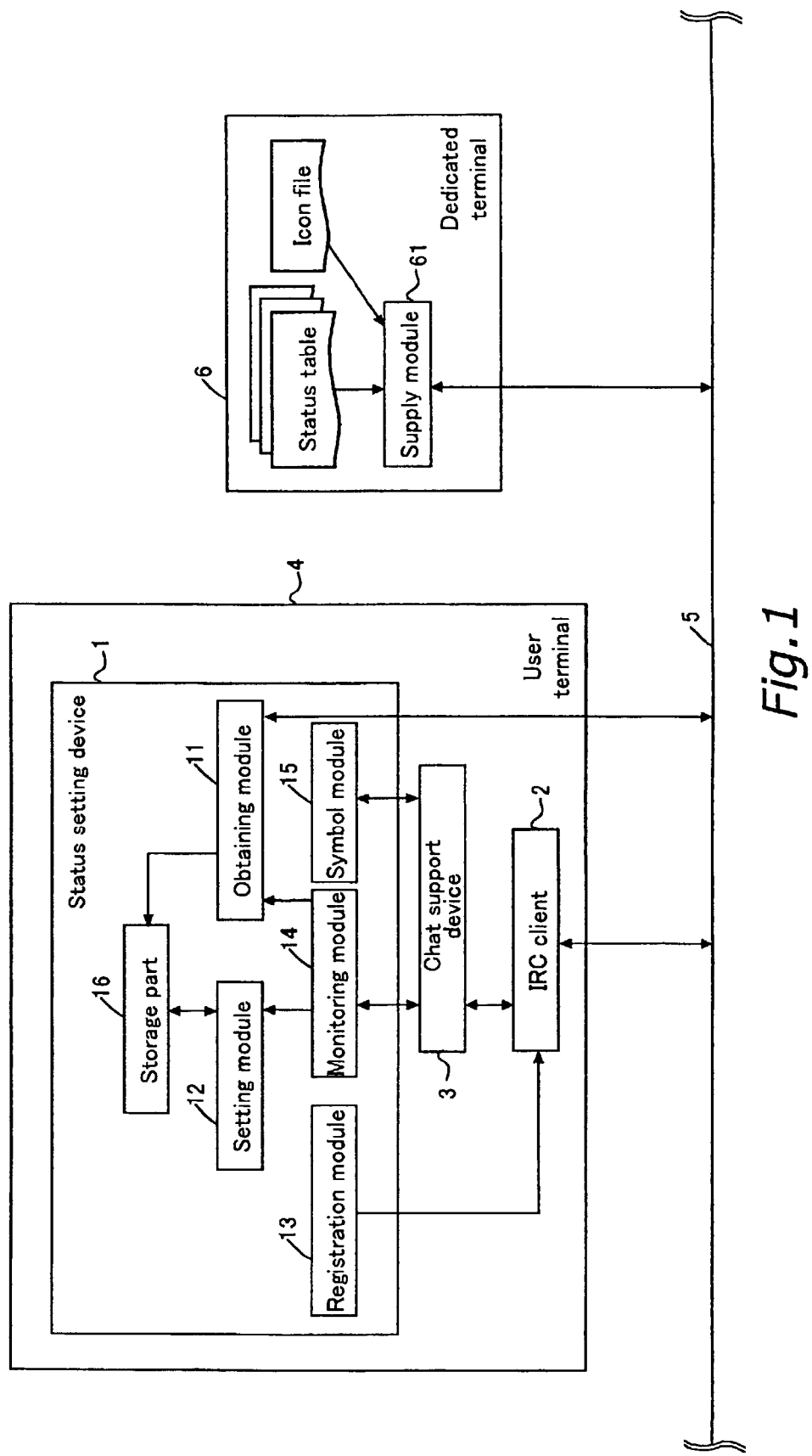
FIG. 1 is a function configuration diagram according to a first embodiment of the present invention.

FIG. 1 is an overall block diagram of the status setting system according to the first embodiment. In this system, a status setting device 1 operates with an IRC client 2 and a chat support device 3 on a user terminal 4. This user terminal 4 is connected to a dedicated terminal 6 via a network 5.

A status table storing settable user statuses is stored in the dedicated terminal 6. A common table storing settable statuses in all channels is also stored in the dedicated terminal 6. Furthermore, an icon file that represents users in a channel and their respective statuses is stored in the dedicated terminal 6. These tables and a required icon file are supplied to a user terminal 4 by a supply module 61 according to a request from the status setting device. For example, an IRC server or a bot on an IRC system can be used as the dedicated terminal 6. An independent information terminal can also be used as the dedicated terminal 6.

The status setting device 1 operates mainly with an obtaining module 11, a setting module 12, and a registration module 13. The obtaining module 11 obtains a status table of a channel in which an IRC client 2 participates from the dedicated terminal 6. The setting module 12 accepts a selection of any status from a status table of each channel. The registration module accepts from a user a setting of a status table reflecting properties of a channel and registers it to the dedicated terminal 6.

The status setting device has a monitoring module 14, a symbol module 15 and a storage part 16 in addition to the above modules. The monitoring module 14 monitors occurrence of prescribed events and operates according to an event that occurred. The symbol module 15 administrates icons represent users in a channel and their statuses. The storage part 16 retains a status table in which users previously participated.

The following explains a process flow of the status setting device 1 having the functions mentioned above.

(1) Monitoring Module

Figure 2:
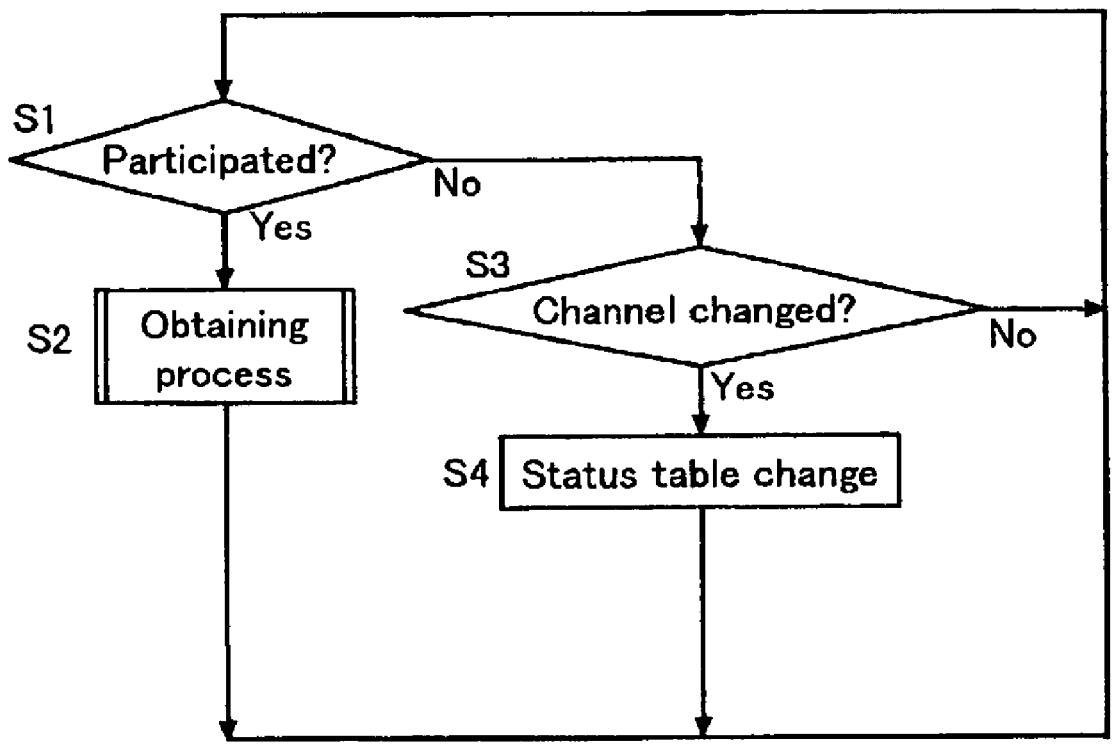
FIG. 2 is a flowchart illustrating flow of a monitoring process in accordance with the first embodiment of the present invention.

FIG. 2 is a flow chart showing the flow of processing performed by the monitoring module. In this process, the status setting system 1 monitors occurrence of prescribed events and performs a process according to an event that occurred. The prescribed event means participation in a new channel and switch a current displayed channel to another. The current channel means a channel that is designated by a user as a display object and a sending-message object.

In step S1, the status setting device 1 determines whether or not the IRC client 2 newly joined in a channel. If the status setting device 1 determines that the result is "Yes," then step S2 ensues. If the status setting device 1 determines that the result is "No," then step S3 ensues.

In step S2, the status setting device 1 executes an obtaining process, which will be described later. Specifically, the status setting device 1 performs a process for obtaining the status table of a channel in which the IRC client 2 newly participates or the common table, and the icon file from the dedicated terminal 6.

In step S3, the status setting device determines whether or not the current channel has changed or not. The current channel can be obtained from the IRC client 2. If the status setting device 1 determines that the result is "Yes," then step S4 ensues. If the status setting device 1 determines that the result is "No," then the status setting device 1 returns the process to step S1 and repeats the aforementioned processes. However, step S3 is performed only if the IRC client 2 independently can display one channel because in this case, a settable user status changes depending on the channel changes that are displayed.

In step S4, the status setting device 1 changes a status table to be displayed. Specifically, the status setting device 1 performs a process such as loading a status table of a channel that newly becomes a current channel in a display buffer. Contents that are loaded in the display buffer are displayed by a setting process, which will be described later.

(2) Obtaining Module

Figure 3:
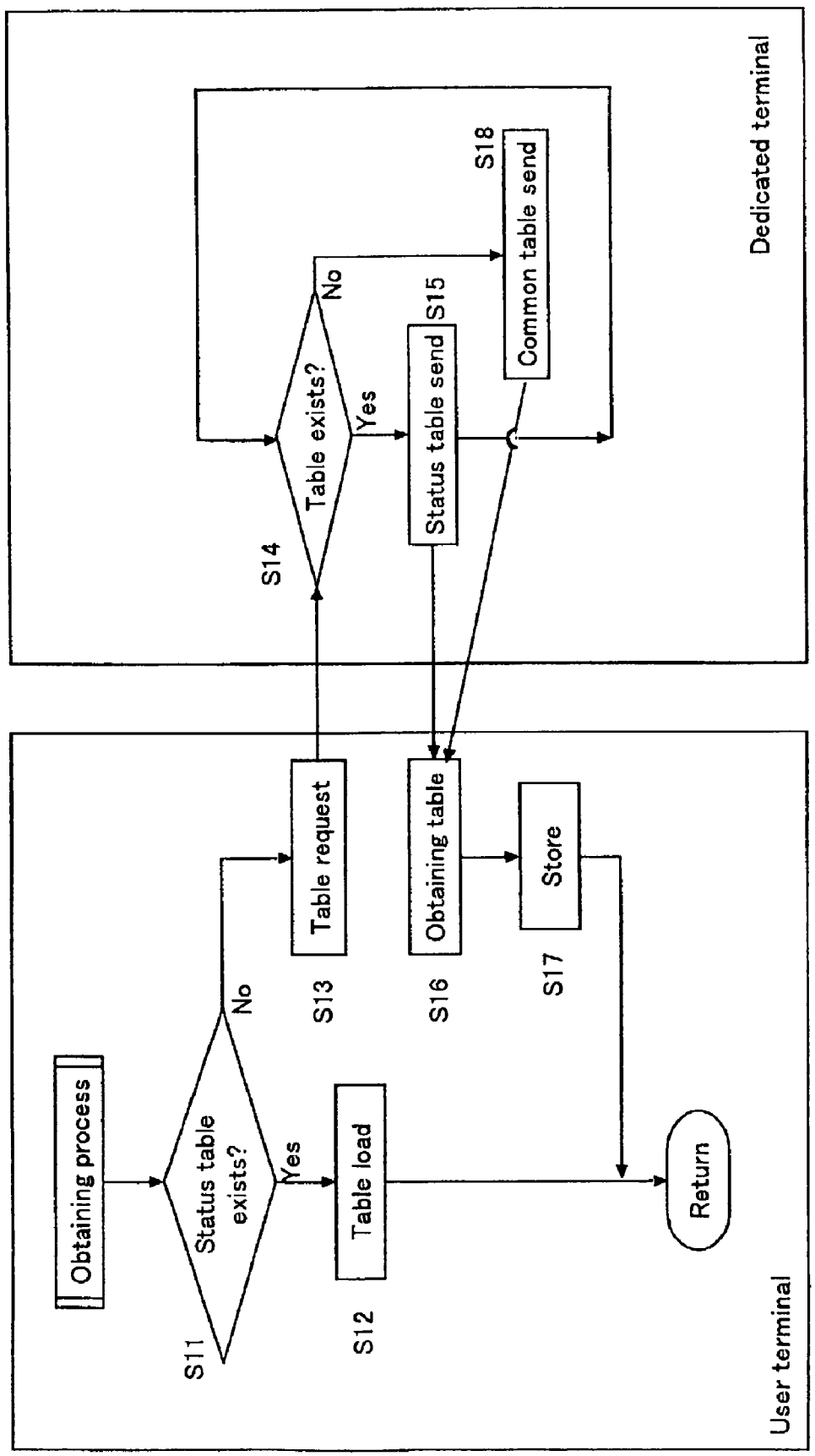
FIG. 3 is a flowchart illustrating flow of an obtaining process in accordance with the first embodiment of the present invention.

FIG. 3 is a flowchart showing the flow of processing performed by the obtaining module. FIG. 3 also shows the flow of a processing performed by the dedicated terminal 6 according to a process of the obtaining module. If the IRC client 2 participates in a new channel, the following process starts.

Step S11 determines whether or not status tables in which a user terminal participates are stored in a storage part 16 such as a hard disk. As described later, if the channel is previously participated in, the status table is stored in the storage part 16 just in case the channel is participated in again. If the status setting device 1 determines that the result is "Yes," then step S12 ensues. If the status setting device 1 determines that the result is "No," then step S13 ensues.

In step S12, the status setting device 1 loads the status table that is already stored in a display buffer from the storage part 16. In step S13, the status setting device 1 requests the status table of a channel in which a user terminal participates from the dedicated terminal 6. In step S14, the dedicated terminal 6 receives a request from the status setting device 1 and determines whether or not the status table that is a target of the request is set. FIG. 6 is an overall structural view of status tables and a common table stored in the dedicated terminal 6. In this figure, a status table is set to channels #CH1 and #CH2. A common table is used for other channels in place of a status table because no status tables are set to them.

Status tables are independently set to each channel. In this example, "Present," "Outside work," "Dealing with a customer," and "Absent" are registered for #CH1. Prescribed identifiers are also registered for each status. Identifiers are used for determining an icon file to display a corresponding status. User attributes as well as settable statuses and identifiers are registered for the channel #CH2. For example, "Yes" or "No" is a settable status only by users with the "Student" attribute. Conversely, "Explaining" or "That's the point" is a settable status only by users with the "Teacher" attribute.

In this example, four statuses "Present," "Away from his/her seat," "Busy," and "Absent" are registered in the common table. This common table is previously prepared, for example, in the system. If the status table of a requested channel has been set, step S15 ensues. Otherwise step S18 ensues as described below.

In step S15, the dedicated terminal 6 sends the requested status table of a channel to the status setting device 1 requesting the status table. An icon file that represents a status registered in the status table is also sent. The icon file will be described later.

In step S16, the status setting device 1 obtains the status table and the icon file.

In step S17, the status setting device stores the obtained status table and the icon file in a storage part 16 such as a hard disk. This is because of utilizing the stored status table without accessing the dedicated terminal 6 if the same channel is participated in again.

In step S18, the dedicated terminal 16 alternatively sends the common table because the requested status table of a channel is not registered. The icon file that represents a status registered in the status table is also sent. The status setting device 1, which received the common table, performs a similar process as when it received a status table.

(3) Setting Module

Figure 4:
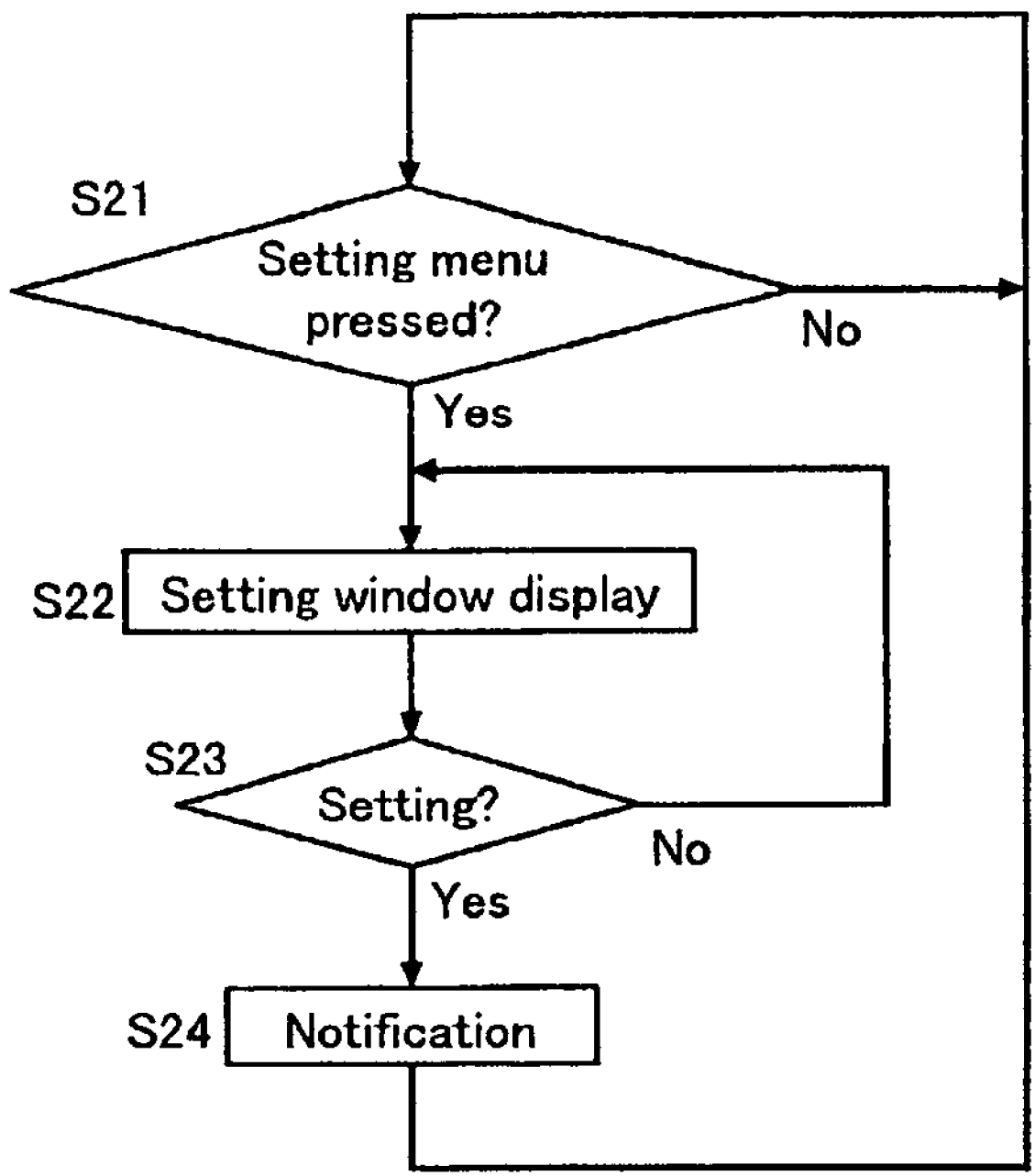
FIG. 4 is a flowchart illustrating flow of a setting process in accordance with the first embodiment of the present invention.
Figure 8:
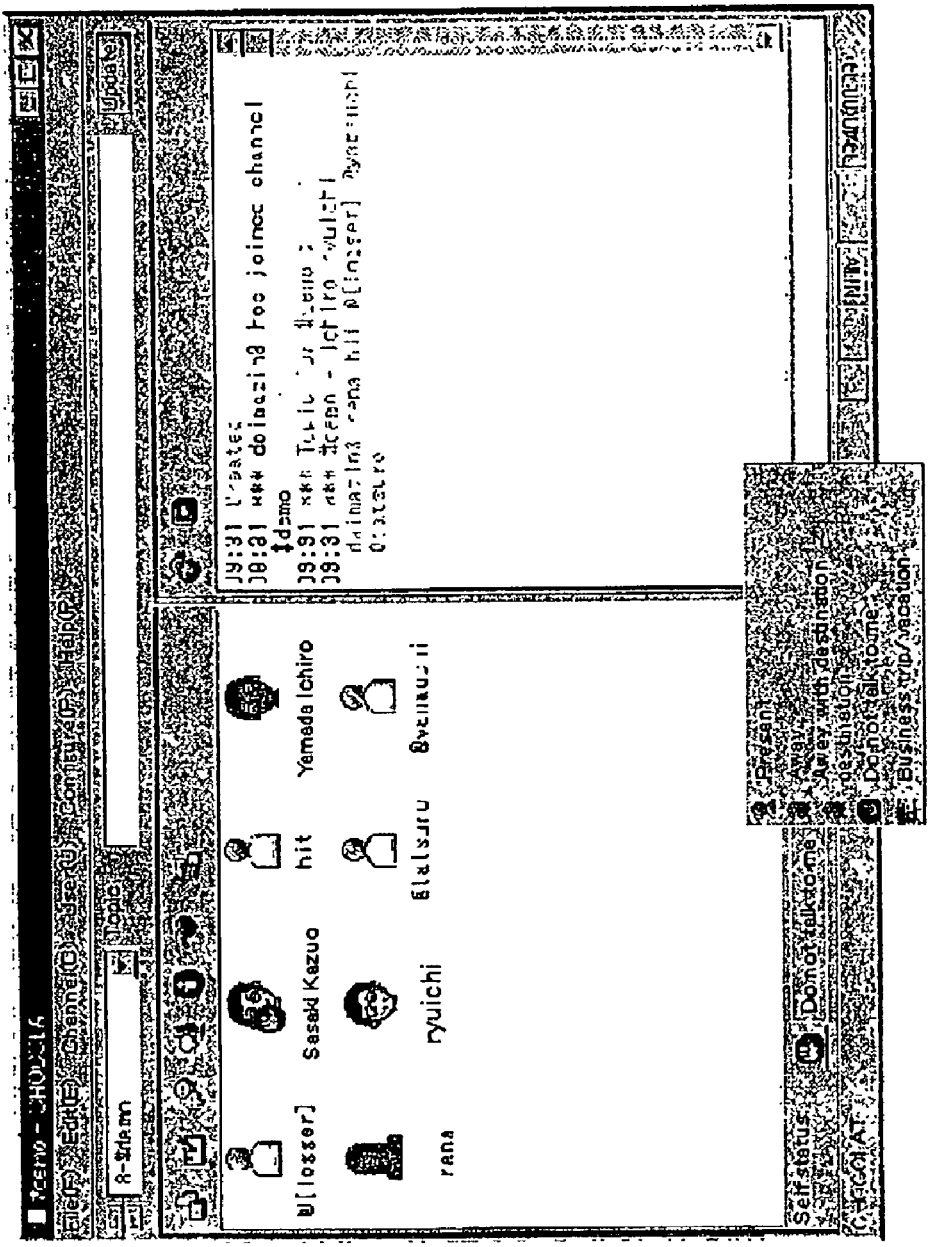
FIG. 8 is a display example of Setting Window when one channel is independently displayed in accordance with the first embodiment of the present invention.

FIG. 4 shows a flowchart showing the flow of processing performed by the setting module. With the setting module, the status setting device accepts the setting of a user status for a channel in which a user terminal participates. Incidentally, as shown in FIG. 7 to FIG. 9, the status setting device 1 displays a Self Status Setting Menubar on the conversation window. The conversation window is a window displaying the conversation in the channel.

In step S21, the status setting device 1 waits for the Self Status Menubar to be pressed, and step S22 ensues after the Self Status Menubar is pressed.

In step S22, the status setting device 1 displays the setting window for setting the self status. An example of the setting window is shown in FIG. 7 to FIG. 9. On the setting window, contents of the status table of a channel to be displayed are displayed. If the status table is not registered, the contents of the common table are displayed.

If the user terminal participates in plural channels, the setting windows are displayed for each channel. FIG. 7 is an example of a setting window when the IRC client 2 independently displays plural conversation windows. The self status setting menu bar and the setting window is independently displayed on each conversation window.

FIG. 8 is an example of a setting window showing that one conversation window can be independently displayed even if the IRC client 2 participates in more than one channel. Contents of the status table of a current channel to be displayed are displayed on the setting screen. If the current channel changes to another channel, contents of the current channel changes. Contents to be displayed are read in the display buffer when a current channel changes to another channel.

FIG. 9 shows setting windows which are displayed when settable statuses vary depending on a user attribute. In this figure, setting windows for a teacher and students on the aforementioned online class channel CH#2 are shown. In the setting windows, visually-distinctive settable statuses and unsettable statuses are displayed corresponding to user attributes. Alternatively, displaying only settable statuses is also possible.

Furthermore, user attributes can be distinguished on both the dedicated terminal and the user terminals. For example, for a channel for an online class, the network address of the user terminal 4 used by a teacher is previously registered in the dedicated terminal 4 to recognize other user terminals as students.

In step S23, the status setting device 1 determines whether or not any of the statuses is selected on the setting window. If the status setting device 1 determines that the result is "Yes," step S24 ensues. If the status setting device 1 determines that the result is "No," the status setting device 1 repeats the determination and waits for any of the statuses to be selected.

In step S24, the status setting device 1 stores a set self status by relating it to a channel. The status setting device notifies of other user terminals 4 in the channel the set self status with a chat support device 3. In other user terminals 4, the chat support device 3 displays the notified user status with an icon.

(4) Registration Module

Figure 5:
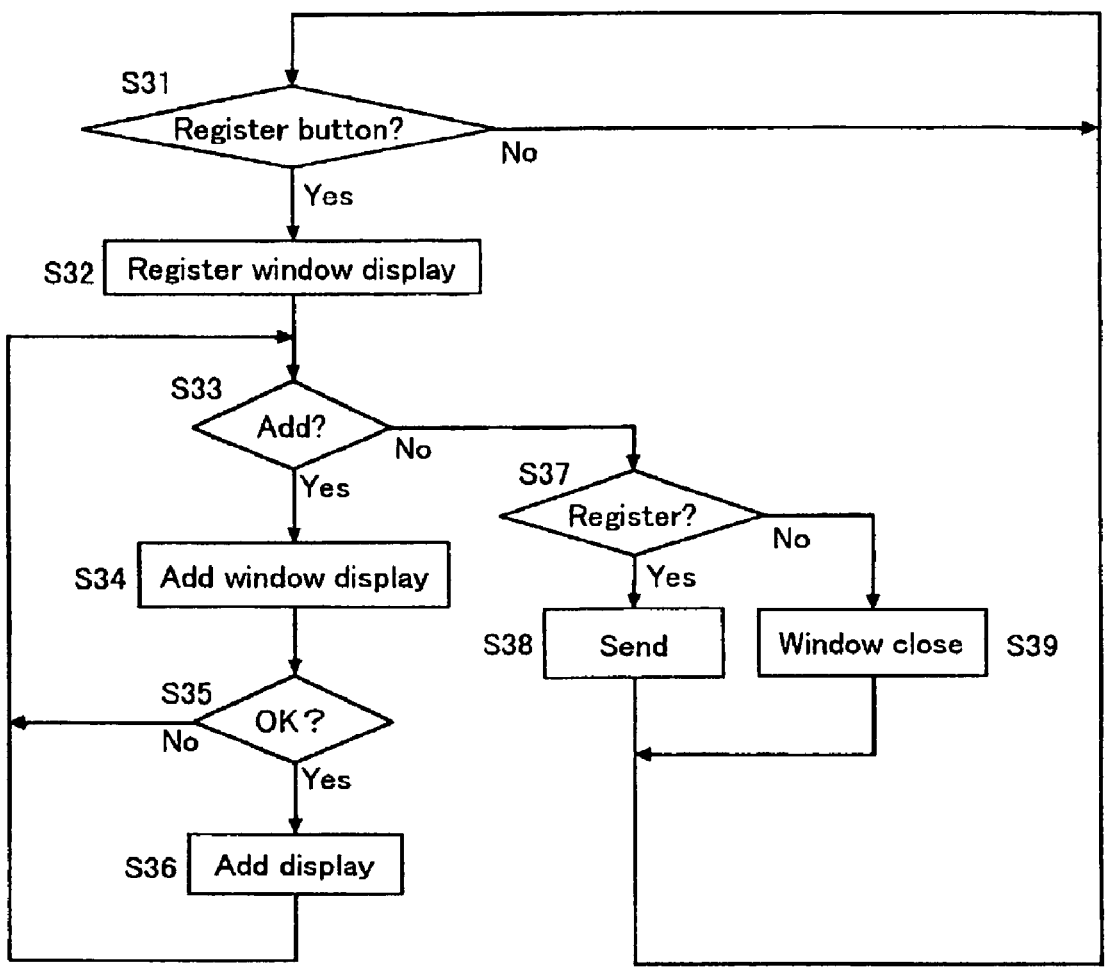
FIG. 5 is a flowchart illustrating flow of a registration process in accordance with the first embodiment of the present invention.

FIG. 5 is a flowchart showing a flow of processing performed by the registration module. In this process, the status setting device 1 receives the setting of the status table. As shown in FIG. 8, the status setting device displays the Register button on the Menubar.

In step S31, the status setting device waits for the Register button to be pressed, and step S32 ensues when the button is pressed. Incidentally, it is preferable to limit the use of Register button according to a user attribute or other authorities in a channel. Granting the authority to use the Register button to an administrator or users having a particular attribute is an example. It is preferable that if a user does not have the authority to use the Register button, indication of such is displayed by graying the Register button (not shown in the figure).

In step S32, the status setting device 1 displays the "registration window" for registering a status in a status table. FIG. 10 shows a display example of a Register Window. In this example, a Main Window 30, an Add button, a Register button, and a Cancel button are arranged on the Register Window.

A user adds a necessary status to the Main Window 30 one after another with the Add button. When the "Register" button is pressed to finish the registration, contents written in the Main Window 30 are transmitted to the dedicated terminal 6. When the Cancel button is pressed, contents of the Main Window 30 are cleared and the Register Window is closed.

In step S33, the status setting device 1 determines whether or not the Add button is pressed in the Register Window. If the status setting device 1 determines that the result is "Yes," step S34 ensues. If the status setting device 1 determines that the result is "No," step S37 ensues, which will be described later.

In step S34, the status setting device 1 displays the Add Window 40 to receive a status setting. Users can select a status to be registered and icon information in the Add Window 40. Icon information is an item for setting an icon file displaying a status to be registered. In this setting example, the "Hard to understand" is displayed with the icon file identified by "_udn.ico." Furthermore, if necessary, users can set user attributes.

In step S35, the status setting device waits for an OK button or the Cancel button to be pressed. When the OK button is pressed in the Add Window, established contents are written in the Main Window 30 and step S36 ensues. When the Cancel button is pressed, the aforementioned step S33 ensues.

In step S36, the status setting device 1 displays contents set on the Add Window 40 in the Main Window 30. Then the status setting device 1 waits for the Add button, the Register button, or the Cancel button to be pressed on the Main Window 30.

In step S37, the status setting device 1 determines whether or not the Register button is pressed in the Register Window. If the status setting device 1 determines that the result is "Yes," then step S38 ensues. If the status setting device 1 determines that the result is "No," then step S39, which will be described later, ensues.

In step S38, the status setting device transmits contents written in the Main Window 30 to the dedicated terminal 6. The dedicated terminal 6 stores the transmitted contents with a channel name as a status table.

In step 39, the status setting device 1 recognizes that the Cancel button is pressed and closes the Register Window.

(5) Symbol Program

As mentioned above, the chat support device 3 displays statuses set by the status setting. In the present embodiment, the chat support device 3 displays a status with an icon file specified by the symbol program 15, or an icon. The symbol program 15 specifies an icon file according to a user status obtained from an icon list and the chat support device 3.

FIG. 11 is a conceptual explanatory diagram of an icon list stored by the dedicated terminal 6. In the icon list, all available icon files are related to icon names and stored. There are two types of icons in the icon file; a fundamental icon representing a user, and a status icon. Several types of fundamental icons are prepared. For each fundamental icon, status icons indicating a user status with the fundamental icon are prepared.

For example, an icon file identified by an icon file name "Man1.ico" in the FIG. 11 is a fundamental icon. The status icon is identified by combination of the file name of the fundamental icon and an identifier "*" i.e. "Man1_*.ico." Wherein "*" is an arbitrary string. An icon file and its file name which are necessary to display a status registered in the status table are transmitted from the dedicated terminal 6 to the user terminal 4.

The symbol program 15 creates a virtual space table on each channel in which a user terminal participates and administrates status icons representing a user status. FIG. 12 is a conceptual explanatory diagram of the virtual space table. In this example, the IRC client 2 participates in channels #CH1, #CH2, and #CH3. The virtual space table correlatively stores user names, user statuses, fundamental icons of users, and status icons of users in a channel in which a user terminal participates.

Identifiers for identifying users in a channel such as nicknames can be used as user names. Statuses of other users obtained from the chat support device 3 are described in "Status." A name of a fundamental icon representing oneself in a channel is described in "Fundamental icon." A file name of a status icon representing a status of each user is described in "Status icon." A Status icon is determined based on a fundamental icon and a status of a user.

The following specifically describes the determination method of a status icon. Assume that the status table of the channel #CH1 is as shown in FIG. 6. In FIG. 12, the user "John" is "Absent" in the channel #CH1. The status icon displaying the "absence" of John is determined as follows. The fundamental icon of John is "Man1.ico." The identifier displaying the status "Absent" in the channel #CH1 is "off." Therefore, the file name of the status icon displaying the absence of John is determined as "Man1_off.ico." The chat support device 3 displays the user status with the determined status icon.

It is also possible to display a user status by displaying a combination of a symbol representing a status and a fundamental icon. The following describes the determination method of a status icon in the above case. FIG. 13 is conceptual explanatory diagram of another icon list stored in the dedicated terminal 6. The dedicated terminal 6 stores a fundamental icon list (a) and an auxiliary icon list (b). In the fundamental list, all fundamental icons are stored with icon file names. In the auxiliary icon list, auxiliary icons representing statuses are stored with icon file names. Herein an identifier "*.ico" representing a status is used for file names of auxiliary icons. A status icon representing a user status is displayed by combining a fundamental icon representing a user with an auxiliary icon representing a status.

Again, consider the user "John" that is the "Absent" status in the channel #CH1 to explain the displaying method of the status icon. The fundamental icon of John is "Man1.ico." The identifier representing the status "Absent" in the channel #CH1 is "off." Therefore, the file name of the auxiliary icon representing the status "Absent" is "off.ico." The combination of the fundamental icon "Man1.ico" and the auxiliary icon "off.ico" is determined as the status icon to be displayed. The chat support device 3 displays the user status with the determined fundamental icon and the auxiliary icon.

Another method is updating a fundamental icon by a module. For example, prepare an icon update module corresponding to an identifier. When a user status changes, the fundamental icon of the relevant user is updated with a module identified by the identifier and the status icon is displayed.

In the above embodiment, a dedicated terminal 6 has been provided. However, a configuration without dedicated terminals 6 is also possible. FIG. 14 is a function configuration diagram of the status setting system with respect to the second embodiment. The status table and common table are previously stored in a storage part 16 by some method. Some method means that these tables are set by users in advance and are stored in each terminal via a recording medium such as CD or a network 5, for example. When the user status is displayed with an icon, the icon list is stored in the status setting device 1.

In this case, the status setting device 1 will not request obtaining a status table even if a new user terminal participates, in a channel. The status setting device determines whether or not a status table in which a new user terminal participates is stored, and reads a common table if it is not stored. Other functions are the same as the above first embodiment.

(B) In the above embodiment, a case in which a conversation device is an IRC client has been exemplified. However, this invention is applicable to other conversation devices. The following describes a case in which a browser is used as a conversation device to perform WebChat.

FIG. 15 is a function configuration diagram of a status setting system with respect to the third embodiment. This status setting system is configured by applying this invention to a WebChat system composed of a browser 2, a WebChat server 7, and a network 5. In a WebChat system, users share a webpage and send and receive character messages. In the figure, same signs accompany components having same functions as in the first embodiment.

Status tables and common tables suitable to each webpage are stored in a WebChat server 7. A Java™ program (obtaining program 71) directing obtaining a status table and a Java™ program setting the status table (setting program 72) are embedded in the webpage provided by the WebChat server 7. The status table to be read is assigned in the obtaining module 71.

The following process is performed after a browser 2 obtains a webpage from the WebChat server 7. First, the obtaining module embedded in a webpage is activated. By this, the browser 2 obtains the status table in the WebChat server 7. The setting module 72 displays "Self Status Setting Menubar" on the conversation window. When the Self Status Setting Menubar is pressed, the setting module 72 displays the setting window in the same way as mentioned above and accepts the user status setting. A registration module 1 and a symbol program 15 are provided for the browser 2. These functions are similar to the first embodiment.

(C) The recording medium to record modules to execute the methods in the present invention is included in the present invention. Herein a floppy disk, a hard disk, a semiconductor memory, CD-ROM, DVD, a magneto-optic disk (MO), etc. are examples of a recording medium.

(D) The transmission medium to transmit modules for executing the methods in the present invention is included in the present invention. Herein a transmission medium is a communication medium on a computer network system (LAN, Internet, or radio communication network) for transmitting and providing module information as a carrier wave as a fiber optic, or a radio circuit.

Status notification suitable to properties of a virtual space is enabled by using the present invention because users in the virtual space can set for each virtual space their self statuses suitable to properties of the virtual space.

While only selected embodiments have been chosen to illustrate the present invention, to those skilled in the art it will be apparent from this disclosure that various changes and modifications can be made herein without departing from the scope of the invention as defined in the appended claims. Furthermore, the foregoing description of the embodiments set forth in the present invention is provided for illustration only, and not for the purpose of limiting the invention as defined by the appended claims and their equivalents.

What is claimed is:

1. A user-status setting method in which a user terminal can send, receive, and display a user status and a character message on at least one virtual space shared on a network, the method comprising:

storing a plurality of user status selection tables including user status options from which a user selects his/her own status for each virtual space in which the user participates;

reading out the user status selection table of each virtual space in which a user terminal participates when the user terminal has participated in a plurality of virtual spaces;

displaying on the user terminal the list of the selectable user statuses for each virtual space based on the read-out user status selection table;

setting a user status which was selected from the list of selectable user statuses for each virtual space in which the user has participated;

sending to each virtual space the set user status receiving from each virtual space the set user status; and displaying the set user status for each virtual space.

2. A status setting method according to claim 1, wherein each user status is associated with an attribute of a user who is permitted to select the user status in the user status selection tables.

3. A status setting method according to claim 1, wherein the user terminal stores a common table in which prescribed user statuses are registered, and sets the common table as a user status selection table for a virtual space in which user terminals participate if no user status selection table is stored for the virtual space.

4. A status setting method according to claim 1, wherein setting of a user status selection table by a user is accepted.

5. A status setting method according to claim 1, wherein said user terminal can display the user statuses with symbols, the user statuses and the symbols are correlatively registered in a user status selection table, and a status of another user sharing a virtual space is displayed with a symbol relating to the user status in the user status selection table.

6. A computer-readable recording medium having a status setting module for executing the method set forth in claim 1.

7. A transmission medium transmitting a status setting module for executing the method set forth in claim 1.

8. A status setting system comprising:

a plurality of user terminals which send and receive user statuses and character messages on at least one virtual space shared on a network;

storing means for storing a plurality of user status selection tables including user status options from which a user selects his/her own status for each virtual space in which the user participates;

obtaining means for reading out the user status selection table of each virtual space in which a user terminal participates when the user terminal has participated in a plurality of virtual spaces;

display means for displaying on the user terminal a list of the selectable user statuses for each virtual space based on the read-out user status selection table;

setting means for setting a user status which was selected from the list of selectable user statuses for each virtual space in which the user has participated;

sending means for sending to each virtual space the set user status; and receiving means for receiving from each virtual space the set user status, wherein the display means displays the set user status for each virtual space.

9. A status setting system comprising:

a plurality of user terminals which send and receive user statuses and character messages on at least one virtual space shared on a network;

a storage unit which stores a plurality of user status selection tables including user status options from which a user selects his/her own status for each virtual space in which the user participates;

an obtaining unit which reads out the user status selection table of a virtual space in which a user terminal participates when the user terminal has participated in a plurality of virtual spaces;

a display which displays on the user terminal a list of the selectable user statuses for each virtual space based on the read-out user status selection table;

a setting unit which sets a user status which was selected from the list of selectable user statuses for each virtual space in which the user has participated;

a communication unit which sends to each virtual space the set user status, and which receives from each virtual space the set user status, wherein the display displays the set user status for each virtual space.

10. The system according to claim 9, wherein the user status includes a string of characters entered by the user.

* * * * *

UNITED STATES PATENT AND TRADEMARK OFFICE
CERTIFICATE OF CORRECTION

PATENT NO. : 7,177,928 B2  Page 1 of 1
APPLICATION NO. : 09/725215
DATED : February 13, 2007
INVENTOR(S) : Kazuo Sasaki et al.

It is certified that error appears in the above-identified patent and that said Letters Patent is hereby corrected as shown below:

Column 11, Line 49, after "status" insert --;--.

Signed and Sealed this

Twenty-fifth Day of March, 2008

JON W. DUDAS
*Director of the United States Patent and Trademark Office*